J. A. GILES.
CROSS HEAD.
APPLICATION FILED JULY 26, 1909.
994,149.
Patented June 6, 1911.
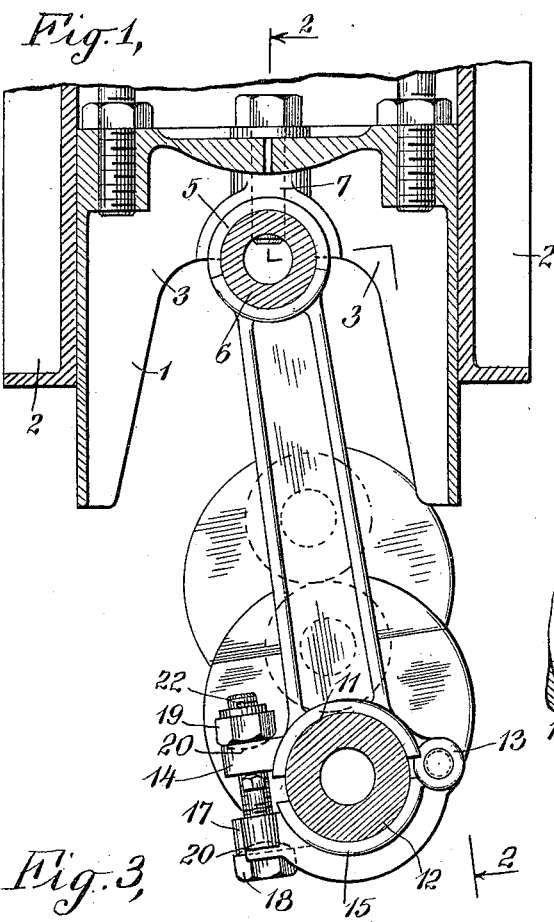
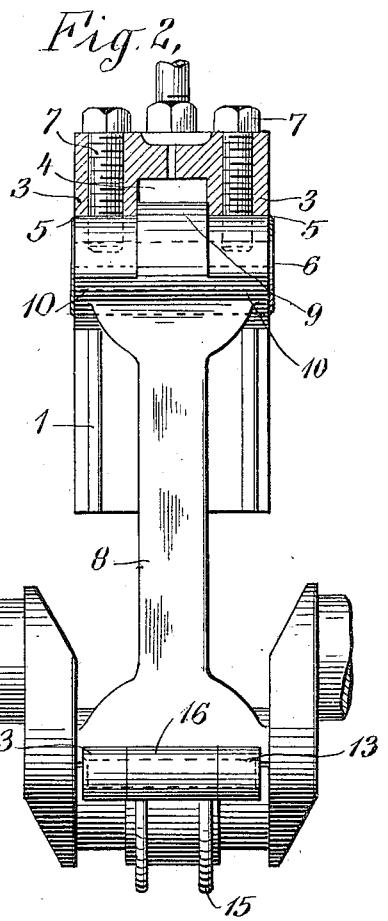
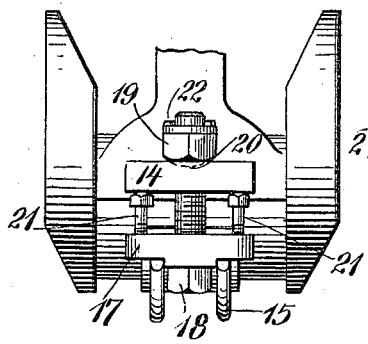
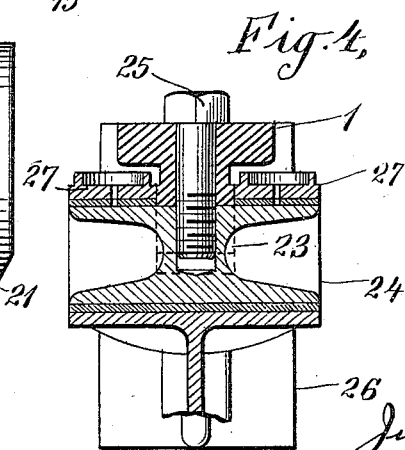
WITNESSES:
Ernest Miller
INVENTOR
Julian A. Giles.
BY
Chas. J. Carll.
ATTORNEY

UNITED STATES PATENT OFFICE.

JULIAN A. GILES, OF DERBY, CONNECTICUT.

CROSS-HEAD.

994,149.  Specification of Letters Patent.  Patented June 6, 1911.

Original application filed March 19, 1909, Serial No. 484,404. Divided and this application filed July 26, 1909. Serial No. 509,746.

*To all whom it may concern:*

Be it known that I, JULIAN A. GILES, a citizen of the United States of America, and resident of Derby, county of New Haven, and State of Connecticut, have invented certain new and useful Improvements in Cross-Heads, of which the following is a specification.

My invention relates to engines; more particularly to the construction of crossheads and connecting rods for gas engines, such as illustrated for instance in my pending application filed March 19, 1909, Serial Number 484,404, from which the present application is divided.

The object of my invention is to provide a crosshead and connecting rod for engines which shall be simple and effective in their construction and operation, of easy adjustment, and in which a relatively long bearing surface is provided for the crosshead pin, in a relatively small space.

My invention consists in the novel construction and arrangement hereinafter fully illustrated and described and pointed out in the claims.

In the drawings accompanying and forming a part of this specification, Figure 1 is a section in a plane normal to the axis of the crank shaft, Fig. 2 is a section on line 2—2 of Fig. 1, Fig. 3 is a partial side view of the lower end of the connecting rod, and Fig. 4 is a section through the crosshead pin showing a modified form.

The reference characters are used in the same sense throughout the drawings and the specification.

Numeral 1 represents a crosshead adapted to operate in any suitable manner in the crosshead guides 2. It is provided with transverse webs 3, separated so as to leave an open space 4 between them and these webs are provided with semi-cylindrical recesses 5 adapted to receive the crosshead pin 6. The crosshead pin is held in position by the bolts 7 which pass down through the webs 3 and are in threaded engagement with the crosshead pin. The connecting rod 8 is provided at its upper end with a bearing 9, having an opening therein adapted to receive and completely surround the central portion of the crosshead pin, and being of appropriate width to fit between the webs or dependent projections 3—3 of the crosshead, and at the sides of the central bearing 9 of the connecting rod are extensions 10 having semi-cylindrical recesses which form a continuation of the opening of the central portion 9 and engage the portions of the crosshead pin 6 which project beyond said central portion. By means of this construction substantially the entire lower half of the crosshead pin 6 is brought into bearing engagement with the connecting rod and since the unsupported portion of the crosshead pin between its seats in the depending lugs 3 is relatively short, the bending moment on said pin is relatively small.

The lower end of the connecting rod is provided with a semi-cylindrical recess 11 adapted to receive the crank 12. It is also provided with a hinge 13 at one side and a lug 14 at the other. The cap 15 is provided with a hinge 16 and a lug 17. A clamping bolt 18 passes through the lugs 14 and 17 and is secured by a nut 19. The nut 19 and the head of the bolt 18 are provided with spherical surfaces adapted to fit corresponding spherical seats 20 in said lugs. A pair of set screws 21 engage tapped holes in the lug 17 of the cap 15 and their heads abut against the lug 14 of the connecting rod. The bolt 18 is provided with a cotter 22 to prevent the nut 19 from coming off, in case it should work loose. By means of this construction it is possible to readily adjust the bearing to properly fit the crank, and by using the cotter 22 in the bolt 18, and since the heads of the set screws 21 are between the lugs 14 and 17, it will be impossible for any of the parts of the bearing to become disconnected in use, even if they should work loose. This is a matter of great importance in engines, because great damage is likely to be caused should any of the parts become disconnected.

In the modified form shown in Fig. 4, the crosshead 1 instead of being provided with two depending lugs 3, is provided with a central depending lug 23 which has a semi-cylindrical groove formed in it adapted to fit the pin 24; the pin being held in position by the bolt 25. In this construction the upper end of the connecting rod 26 is forked; the two ends 27 completely inclose the pin, while the intermediate portion is cut away a sufficient amount to receive the central lug 23. In this case, as in the other, the crosshead pin 24 has a bearing engagement with the connecting rod, bearing on its under side throughout its entire length.

Having thus described my invention what I claim is:

1. The combination with a crosshead provided with a semi-cylindrical recess, of a cylindrical crosshead pin adapted to fit said recess and fastening means between said crosshead and said crosshead pin.

2. The combination with a crosshead provided with a semi-cylindrical recess, of a crosshead pin adapted to fit said recess, fastening means between said pin and said crosshead, and a connecting rod having a bearing adapted to fit substantially half the cylindrical surface of said pin for substantially its entire length.

3. The combination with a crosshead provided with concave seats and having a recess formed between said seats, of a pin, screws securing said pin to said seats, and a connecting rod provided with a bearing at its end having a central portion which surrounds the central portion of said pin, and extensions at the sides of said central portion which engage the portion of said pin opposite to said seats.

4. A connecting rod having a bearing provided with a central portion adapted to surround a crosshead pin and extensions at the side of said central portion less than completely surrounding the pin in combination with the pin adapted to fit said bearing.

5. The combination with a crosshead provided with a concave recess, of a cylindrical pin adapted to fit said recess, and a bolt or screw engaging said crosshead and said pin to secure said pin in said recess.

6. A connecting rod having a crosshead pin bearing at one end thereof, in combination with a pin adapted to fit said bearing, the central portion of said bearing completely surrounding said pin, and the sides thereof being cut away on the side opposite to the side which takes the thrust.

In testimony whereof, I have signed my name to this specification in the presence of two subscribing witnesses.

JULIAN A. GILES.

Witnesses:
FRANK M. CLARK,
WM. S. BROWNE.